Aug. 27, 1957 F. J. AITCHISON 2,804,092
HOSE CLAMP
Filed Feb. 23, 1954

INVENTOR
Fredrick J. Aitchison
BY
H. F. Johnston
ATTORNEY

United States Patent Office 2,804,092
Patented Aug. 27, 1957

2,804,092

HOSE CLAMP

Frederick J. Aitchison, Oakville, Conn., assignor to Scovill Manufacturing Company, Waterbury, Conn., a corporation of Connecticut Application February 23, 1954, Serial No. 411,781

2 Claims. (Cl. 137—625.18)

This invention relates to improvements in hose clamps and particularly to one that is useful as a shut-off device for either single or multiple hose.

There has recently appeared on the market a "Soaker" hose for use in watering lawns or gardens. This type of hose is supplied as a single tube hose or a double tube hose, the latter being two or possibly more pieces of single hose joined together in contiguous relationship. Both types of hose are provided with a series of very minute holes spaced along their length. As originally made this type of hose had one end permanently sealed off and consequently prevented the escape of any dirt or foreign matter that might become entrapped within the hose. In order to overcome the above fault, the distal end of the hose is now left unsealed and that end of the hose may now be sealed off with my removable clip which may be periodically removed to flush out the hose.

Another difficulty experienced in the double or triple type of hose was that the common form of hose clamp was not suitable to obtain a leak-proof seal because of the increased wall thickness that occurred where the hose unit is laterally joined together.

It is one of the objects of this invention to provide a hose clamp that is capable of being used to seal off the distal end of either of the single or multiple types of "Soaker" hose and one that can be easily removed for the purpose of cleaning out the hose.

This invention, both as to its construction and method of operation, together with further objects and advantages thereof will best be understood from the following description and the accompanying drawing.

Figure 3:
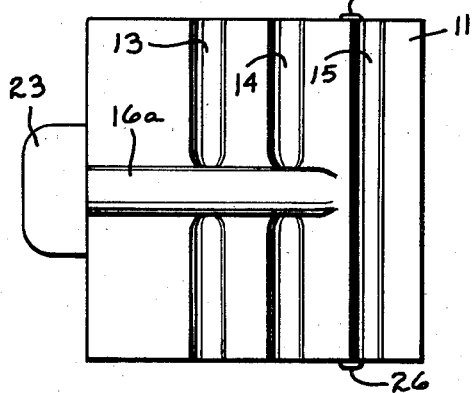
Fig. 3 is a bottom plan view of the same.

Referring to the accompanying drawing wherein like reference numerals designate like parts throughout the several views, the hose clamp consists of a channel frame 10 including a base 11 and opposite upstanding side flanges 12. The base 11 is formed with three upwardly raised transverse ribs 13, 14 and 15 that extend entirely across the width of said base. The first two ribs 13 and 14, as best shown in Fig. 3, are intercepted by a longitudinal central groove 16 formed downwardly relative to the base 11 in the direction opposite to the ribs 13, 14 and 15 and thus forming a rib 16a on the bottom surface of the base 11. The arrangement of the ribs 13, 14 and 15 in addition to strengthening the base 11 also provide relatively broad transverse hose-receiving channels 17 and 18, for reasons as will be described later.

The side flanges 12 are each provided with a pair of vertically disposed trunnion slots 19 and 20 that are connected to each other by a horizontal slot 21 intercepting said vertical slots relatively close to their lower extremities.

Figure 5:
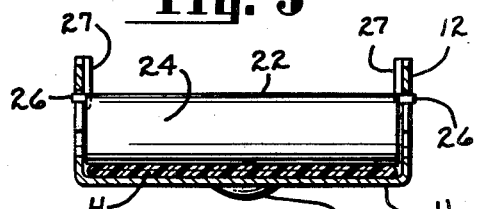
Fig. 5 is a cross-sectional view of the same taken along the line 5—5 of Fig. 4.
Figure 4:
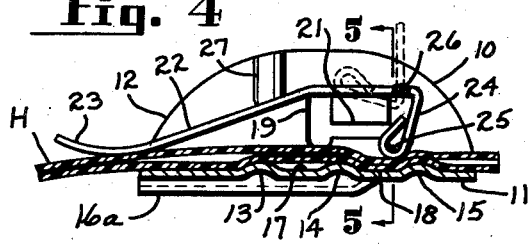
Fig. 4 is a longitudinal sectional view through the hose clamp showing it as clamped upon a single hose.

The single type of "Soaker" hose is designated by the letter "H" and is shown in Figs. 4 and 5. In order to clamp or seal the open end of this hose, provision is made of a clamp lever 22 that extends across substantially the full width of the channel frame 10. One end of this clamp lever 22 is provided with a reduced handle portion 23 for manipulating purposes, while the opposite end is formed with an angularly arranged compression bar 24 doubled over upon itself in such a manner as to provide a rounded bight 25 that serves to clamp against the hose material without danger of cutting into the same. The opposite edges of the clamp lever 22 have extended trunnions 26 adapted to pivotally engage in the trunnion slots 19 and 20.

In order to impart a frictional resistance to the pivoting action of the clamp lever 22 when clamped upon the hose and also to prevent said lever from loosely flopping about in the channel frame 10 when not in use, a pair of indented sections 27 are formed inwardly in the side flanges 12 and are dimensioned to have frictional contact with the opposite side edges of said clamp lever 22.

Operation

Figure 1:
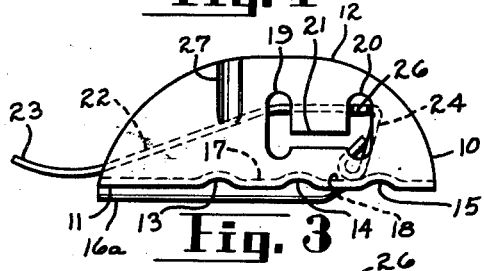
Fig. 1 is a side elevational view of my hose clip as it appears removed from the hose and embodying my invention.
Figure 2:
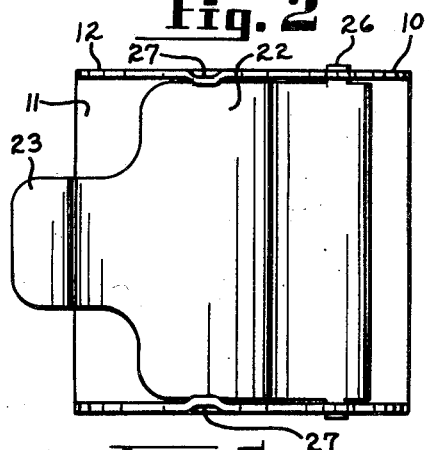
Fig. 2 is a top plan view of the same.

In the operation of this hose clamp, when used on a single type of "Soaker" hose H, the clamp lever 22 is located in the channel frame as seen in Figs. 1 and 4, that is, with the trunnions 26 of said lever operating in the slots 20. The lever 22 may be swung to the position shown in dotted outline of Fig. 4, leaving ample space between the grip flange 24 and the frame base 11, so as to permit easy assembly of the clip upon the hose and position it a short distance from hose open end. The clamp lever 22 may then be swung to the full line position of Fig. 4 thereby firmly compressing the hose into the base channel 18 and assuring a leakproof grip upon the hose material between the grip flange bight 25 and the rim 15. It will be noted that the groove 16 extends only to the cross channel 18 so that there is provided a transversely flat surface against which a single hose may be clamped.

Figure 7:
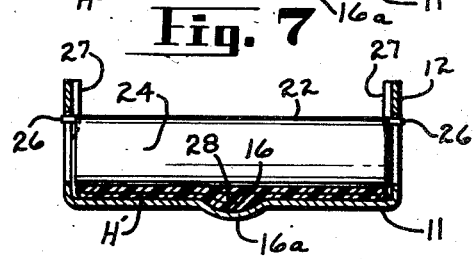
Fig. 7 is a cross-sectional view of same taken along the line 7—7 of Fig. 6.
Figures 6, 9:
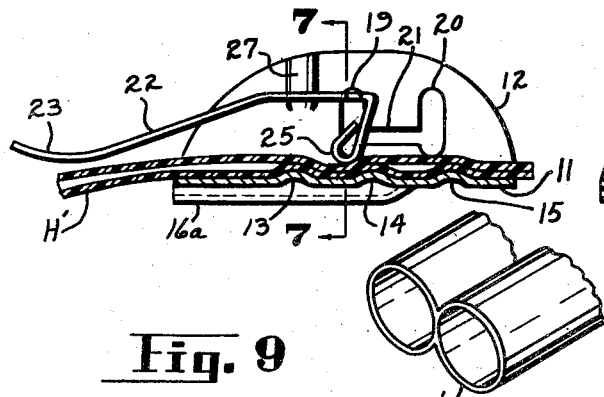
Fig. 6 is a longitudinal section through the clamp showing it as clamped upon a twin or double hose.
Fig. 9 is a perspective view of a section of the twin type of hose.
Figure 8:
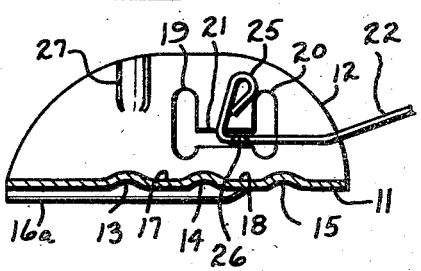
Fig. 8 is a side view of the clip showing how the clamp lever arm is positioned to be shifted from one position to another.

In assembling my hose clip to a double type of "Soaker" hose H' as shown Figs. 6 and 7, it is necessary to shift the clamp lever 22 to a different pivoting position in the channel frame 10 than that in which the clip is located when attached to a single type of hose H. To effect this shift in position, the clamp lever 22 should be turned substantially 180° to the position as shown in Fig. 8, wherein the trunnion 26 can be aligned with the connecting slots 21 and shifted from slots 20 to slots 19. In this position the clamp may then be slipped over the end of the double hose H' after which the clamp lever 22 can be swung to hose clamping position, as shown in Fig. 7, where the hose H' will be compressed within the channel 17 between the ribs 13 and 14. It is to be noted from Fig. 7 that in the double type of hose H' there is an extra amount of hose material along the point of attachment of the two single hose members as indicated at 28. This portion of the hose of double wall thickness may be compressed down within the central groove 16, so as to afford a sufficient clamping action along the other transverse portion of the double hose to assure a leakproof clamping connection.

From the above description it will be seen that I have provided a hose clamp which can be placed on or removed from two different types of "Soaker" hose without the need of having a separate clamp for each type of hose, and which clamp is capable of sealing both types of hose regardless of their difference in construction.

While the form of the invention herewith shown and described embraces a preferred embodiment of the same, it is to be understood that the construction may be varied as to mechanical details without departing from the spirit of the invention and the scope of what is claimed.

What I claim is:

1. A hose clamp adapted for alternate use for shutting off either a single flexible hose or a multiple flexible hose where two or more hose elements are integrally joined in parallel relation, said clamp comprising a channel frame with a base against which the hose may be clamped, said base having at least one groove which extends longitudinally thereof only a part of the length of the base, each of said side flanges having two longitudinally spaced bearing apertures, one set of which is transversely aligned with the groove in said base, whereas the other set is aligned with a transversely flat portion of the base, said side flanges also having slots leading from one aperture to the other, and a clamping lever having trunnions adapted to fit in either set of said apertures, or to move along said slots from one set of bearing apertures to the other, said clamping lever having a handle portion and a compression bar at an angle thereto adjacent said trunnions so that a single hose may be clamped against the transversely flat portion of said base when said trunnions are in one set of apertures and a plural hose may be gripped when said trunnions are in the other set of apertures opposite the grooved portion of the base so that the extra thickness of material at the juncture of the plural hose elements may be accommodated in said groove in the base.

2. A hose clamp as defined in the preceding claim wherein each of the slots in the side flanges first extends downwardly from the pivot apertures and thence lengthwise between the downwardly extending portions.

References Cited in the file of this patent
UNITED STATES PATENTS

| 350,850 | Tatum | Oct. 12, 1886 |
| 1,032,664 | France | July 16, 1912 |
| 1,432,882 | Lobl | Oct. 24, 1922 |